United States Patent
Trinkel et al.

(10) Patent No.: US 7,627,472 B2
(45) Date of Patent: Dec. 1, 2009

(54) METHOD AND SYSTEM FOR PERSON/SPEAKER VERIFICATION VIA COMMUNICATIONS SYSTEMS

(75) Inventors: Marian Trinkel, Kreuzau (DE); Christel Mueller, Schulzendorf (DE); Fred Runge, Wuensdorf (DE)

(73) Assignee: Deutsche Telekom AG, Bonn (DE)

( * ) Notice: Subject to any disclaimer, the term of this patent is extended or adjusted under 35 U.S.C. 154(b) by 811 days.

(21) Appl. No.: 11/083,744

(22) Filed: Mar. 18, 2005

(65) Prior Publication Data

US 2005/0228675 A1 Oct. 13, 2005

(30) Foreign Application Priority Data

Mar. 18, 2004 (DE) .................. 10 2004 014 416

(51) Int. Cl.
*G10L 17/00* (2006.01)

(52) U.S. Cl. ............... 704/246; 704/249; 704/273; 704/270; 379/88.02; 379/189; 379/93.25; 379/93.12; 382/115; 382/118; 705/44; 705/75; 705/14; 705/39; 713/186

(58) Field of Classification Search ............ 704/246, 704/249, 273, 270, 275, E17.015, E17.009, 704/E17.016, E17.003; 379/88.02, 189, 379/93.12, 93.25; 382/115, 118; 705/44, 705/75, 14, 39; 713/186, 171
See application file for complete search history.

(56) References Cited

U.S. PATENT DOCUMENTS

| | | | | |
|---|---|---|---|---|
| 5,850,430 A | * | 12/1998 | Hamalainen | 379/93.02 |
| 5,850,442 A | * | 12/1998 | Muftic | 705/65 |
| 5,897,616 A | * | 4/1999 | Kanevsky et al. | 704/246 |
| 6,081,782 A | * | 6/2000 | Rabin | 704/275 |
| 6,092,192 A | * | 7/2000 | Kanevsky et al. | 713/186 |
| 6,094,632 A | | 7/2000 | Hattori | |
| 6,161,090 A | * | 12/2000 | Kanevsky et al. | 704/246 |
| 6,167,251 A | * | 12/2000 | Segal et al. | 455/406 |
| 6,219,639 B1 | * | 4/2001 | Bakis et al. | 704/246 |
| 6,222,915 B1 | | 4/2001 | Mueller et al. | |
| 6,272,338 B1 | * | 8/2001 | Modzelesky et al. | 455/430 |
| 6,292,778 B1 | * | 9/2001 | Sukkar | 704/256.4 |
| 6,529,871 B1 | * | 3/2003 | Kanevsky et al. | 704/246 |
| 6,965,816 B2 | * | 11/2005 | Walker | 701/16 |
| 2007/0220272 A1 | * | 9/2007 | Campisi et al. | 713/186 |

FOREIGN PATENT DOCUMENTS

| | | |
|---|---|---|
| DE | 19527022 C2 | 1/1997 |
| DE | 19812897 C2 | 8/2000 |
| DE | 69800320 T2 | 5/2001 |
| DE | 69814195 T2 | 1/2004 |
| EP | 0756410 | 1/1997 |
| EP | 0892388 | 1/1999 |

* cited by examiner

*Primary Examiner*—Vijay B Chawan
(74) *Attorney, Agent, or Firm*—Kenyon & Kenyon LLP

(57) ABSTRACT

A method and a system for person/speaker verification via different communications systems. The system may include a control logic (SL) having access to a voice-controlled dialog system (DS) having verification dialogs stored for querying, a biometrics customer profile (BK), in which the personal biometric data of customers are stored and a provider database (PD), which contains information regarding protected database areas and services in conjunction with the biometric methods authorized for verification. The method for person/speaker verification is designed to ascertain, transmit, analyze and evaluate via telecommunications systems the different personal biometric data that are suitable to establish unequivocally the access authorization of a customer.

4 Claims, 2 Drawing Sheets

METHOD AND SYSTEM FOR PERSON/SPEAKER VERIFICATION VIA COMMUNICATIONS SYSTEMS

CROSS-REFERENCE TO RELATED APPLICATION(S)

The present application claims priority to Application No. 102004014416.8, filed in the Federal Republic of Germany on Mar. 18, 2004, which is expressly incorporated herein in its entirety by reference thereto.

FIELD OF THE INVENTION

The present invention relates to a system and a method for person/speaker verification of participants via different communications systems.

BACKGROUND INFORMATION

It is available to identify a telecommunications line via the line identification CLI (calling line identification), ANI (automatic number identification), IP address (Internet protocol address) or HLR (home location register) transmitted in various telecommunications networks.

It is possible to differentiate individual users of one telecommunications line based on a query for a personal identifier such as a PIN, for example. The PIN in this context is a personal secret number by which the user proves his or her identity with respect to a system.

Voice recognition systems and speaker recognition systems are also available. In voice recognition systems, it is the content of the spoken utterance that is recognized. The generally available voice recognition systems are based on voice recognition algorithms such as, for example, by systems providers nuance communications or Temic, which are able to recognize a larger number of words in real-time. If algorithms of this kind are used for the voice-controlled operation of, for example, the functions of a telecommunications terminal, then there is the problem of recognizing/identifying a concrete user. This problem is solved by speaker recognition systems. This group includes speaker verification systems. In speaker verification systems, the identity asserted by a person is checked by analyzing a sample of the voice of this person. The principle of speaker verification is based on the assumption that every person can be uniquely identified by their voice. The security standard of a design approach of this kind depends on how well the verification algorithm is able to differentiate the voice of an authorized user from all unauthorized users. This principle, however, requires considerable investments in time and effort to conduct a training process of the respective verification system that is required in this design approach.

Additional available biometric person/speaker verification systems are based, for example, on the comparison of a fingerprint, the comparison of hand geometry, the comparison of the retina, the comparison of the face or a comparison of the signature.

Another available design approach for establishing the identity of a person is based on the technology of verification with the aid of verbal information (VIV). This concerns information that is known solely to the participant to be verified and the content of which with reference to question and response was established between the service provider and the participant to be verified in a process prior to the verification as such. This can be, for example, a personal legitimization statement, a PIN, a place of birth, a birth name or a residential address.

Thus, for example, German reference DE 195 27 022 C2 purportedly describes a method for authenticating service users, particularly for authenticating users of a language value-added service, virtual card calling (VCC) and authentication card, in which for each service user a set of information established individually for the user, made up of a number of queries and a number of associated responses, is stored. One or more queries are selected from the set of queries and are sent to the user for reply. Only if the responses entered by the customer match the respective centrally stored responses to the questions, will the user be granted access to the requested service. This design approach is based on a self-contained set of information made up of questions and the corresponding answers, which was previously coordinated with the user.

Reference DE 698 00 320 T2 purportedly concerns a method and a device for speaker recognition based on verifying verbal information by forced decoding. This design approach is also based on verifying the verbal informational content, which is contained in an utterance made by the speaker. Speaker verification here occurs on the basis of a forced decoding of the spoken utterance, which is based on a special legitimization statement, which is assigned to a specified speaker. This design approach also has recourse to a text already arranged with the user.

Reference DE 698 14 195 T2 purportedly concerns a device for speaker recognition or a speaker recognition method, in which the speaker verification occurs upon the query of a identifier, a previously coordinated text and a codeword from the participant to be verified.

Reference DE 1981 2897 purportedly concerns a method for providing telecommunications-based services, in which via a dialogue a customer is provided with a variant from a plurality of possible services, which he requires for solving his problem or his service request. To this end, it is verified whether the customer has access to the terminal configuration required for this variant or that the customer's terminal configuration supports the service or service combination on which the variant is based.

Available design approaches for person recognition are mostly individual solutions. This is also true of verification systems based on the evaluation of personal biometric data. In these systems, access is granted to an area or service protected by this system following a successful verification. If the verification is not successful, access is denied, or an additional verification attempt is conducted, e.g., according to the principle of verification by verbal information. This applies also to services offered by service providers who restrict access to their services with the aid of a biometric method.

In the "mobile society", there is an ever-increasing need to be able to access databases of service providers or to make use of services of service providers in any place and at any time, preferably via the Internet. Mobile access to these services, however, requires a special security management, which guarantees access to internal data or protected areas and services with the required security.

SUMMARY OF THE INVENTION

Embodiments of the present invention provide a design approach to grant a customer access in case of need to a plurality of options for person/speaker verification within the scope of a complex security management.

Embodiments include a method and a system which supports particularly mobile access for customers to database areas or services of a service provider which are preferably secured by biometric security systems.

Embodiments of the present invention relate to a system and a method for person/speaker verification. Components of the system are a control logic SL having access to
- a voice-controlled dialog system DS having verification dialogs (verification query module V) stored for query.
- a module for determining the telecommunications line TA
- a database for biometrics customer profiles BD, in which the biometrics customer profiles BK are stored and
- a provider database PD.

Embodiments of the present invention include a method for person/speaker verification is designed to ascertain, transmit, analyze and evaluate via telecommunications systems the different personal biometric data that are suitable to establish unequivocally the access authorization of a customer. While observing the security requirements necessary for access, this allows a customer to exhaust all available verification options for granting an authorized customer access to a protected database area or to a protected service offered by a service provider.

According to the present invention, for every customer, according to the customer's communications data and communications behavior, an individual biometrics customer profile BK is established and stored in a database for biometrics customer profiles BD. For this purpose, the communications data refer to the terminals or terminal configurations available to the customer. The communications behavior refers to the communications offerings normally used by the customer, which are offered for example via databases, database areas and services from service providers. The biometrics customer profile BK according to the present invention may also contain all terminals and terminal configurations available to the customer, which are suitable for a verification using biometric data. To this end, every terminal or every terminal configuration is linked to the corresponding line identification. The line identification makes it possible a) unequivocally to identify a terminal or a terminal configuration and b) to assign it unequivocally to the owner of the line. At the same time, every terminal and every terminal configuration and thus also every line identification is assigned the biometric method, via which a verification process can be technically implemented using the terminal or the terminal configuration.

To prepare his individual biometrics customer profile BK, the customer must register prior to use. In a registration process, all of the customer's biometric basic data, which are possible on the basis of his terminals or terminal configuration, are ascertained and stored in his individual biometrics customer profile BK.

As a result of the registration process, there exists in a database for biometrics customer profiles BD for every customer an individual biometrics customer profile BK, which makes it possible to provide for the customer, according to the technical possibilities of his terminals or terminal configurations, if needed, automatically and in succession all verification options authorized for accessing a protected database are or service.

If a customer, for whom a biometrics customer profile BK has already been prepared, calls a portal, on which the design approach according to the present invention is implemented as system approach E, and requests access to a biometrically protected database area or service D, then a matrix-like structured control logic SL, which has access to a module for determining the telecommunications line TA and the database for biometrics customer profiles BD, recognizes on the basis of the line identification of the terminal or the terminal configuration used by the customer for the call in comparison with the data of the biometrics customer profile BK, which terminals or terminal configurations are available to the customer for a verification by biometric methods. By the destination number selected by the customer, it is possible to detect which service the customer is requesting or to which protected database area or service D secured by biometric verification methods the customer requests access. On the basis of a provider database PD, in which all database areas or services in conjunction with the respective access addresses/access call numbers and access conditions offered on the portal are stored, the matrix-like structured control logic SL ascertains the access conditions, which control the customer's access to the requested database area or service D. Access conditions in the sense of the present invention is the list of the biometric verification methods authorized for accessing requested service D.

Control logic SL compares the terminals and terminal configurations available to the customer with the access requirements established for requested service D. This comparison determines which verification options authorized for the respective service D are available to the customer on the basis of his terminals or terminal configuration. The data thus ascertained are provided to a voice-controlled dialog system DS, via which the further interaction for realizing the customer's access request occurs.

Within the framework of appropriately preprogrammed dialogs, dialog system DS offers the customer in succession from all the verification options authorized for the respective service D in succession those verification options that are technically accessible to the customer. The dialog between dialog system DS and the customer controlled via control logic SL in connection with voice-controlled dialog system DS is continued until on the basis of a successful verification attempt the access to the requested service D is enabled or until all verification options authorized for service D and supported by the customer's terminal configuration are exhausted. The design approach, of course, also offers the possibility of making access to a secured area or service D dependent on the verification via at least two different verification methods.

DETAILED DESCRIPTION

Figure 1:
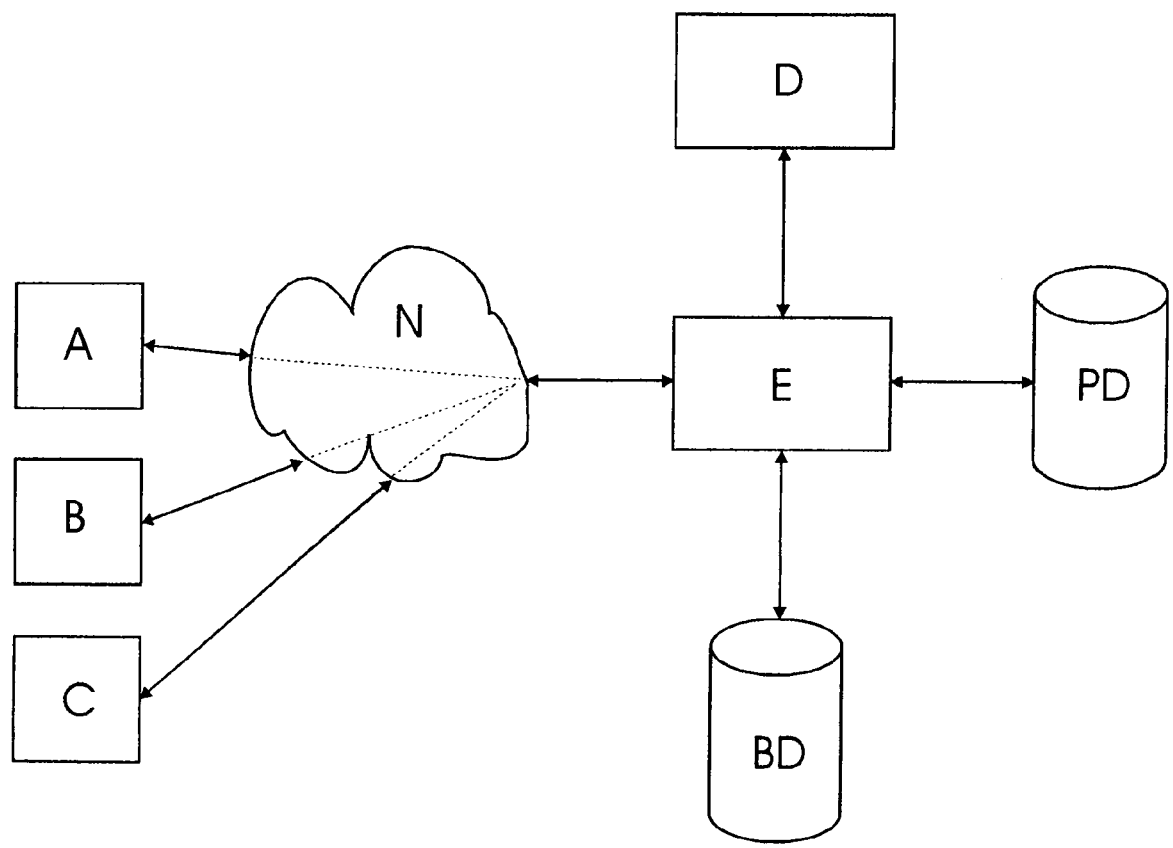
FIG. 1 shows a possible architecture for implementing the service with the aid a block diagram.
Figure 2:
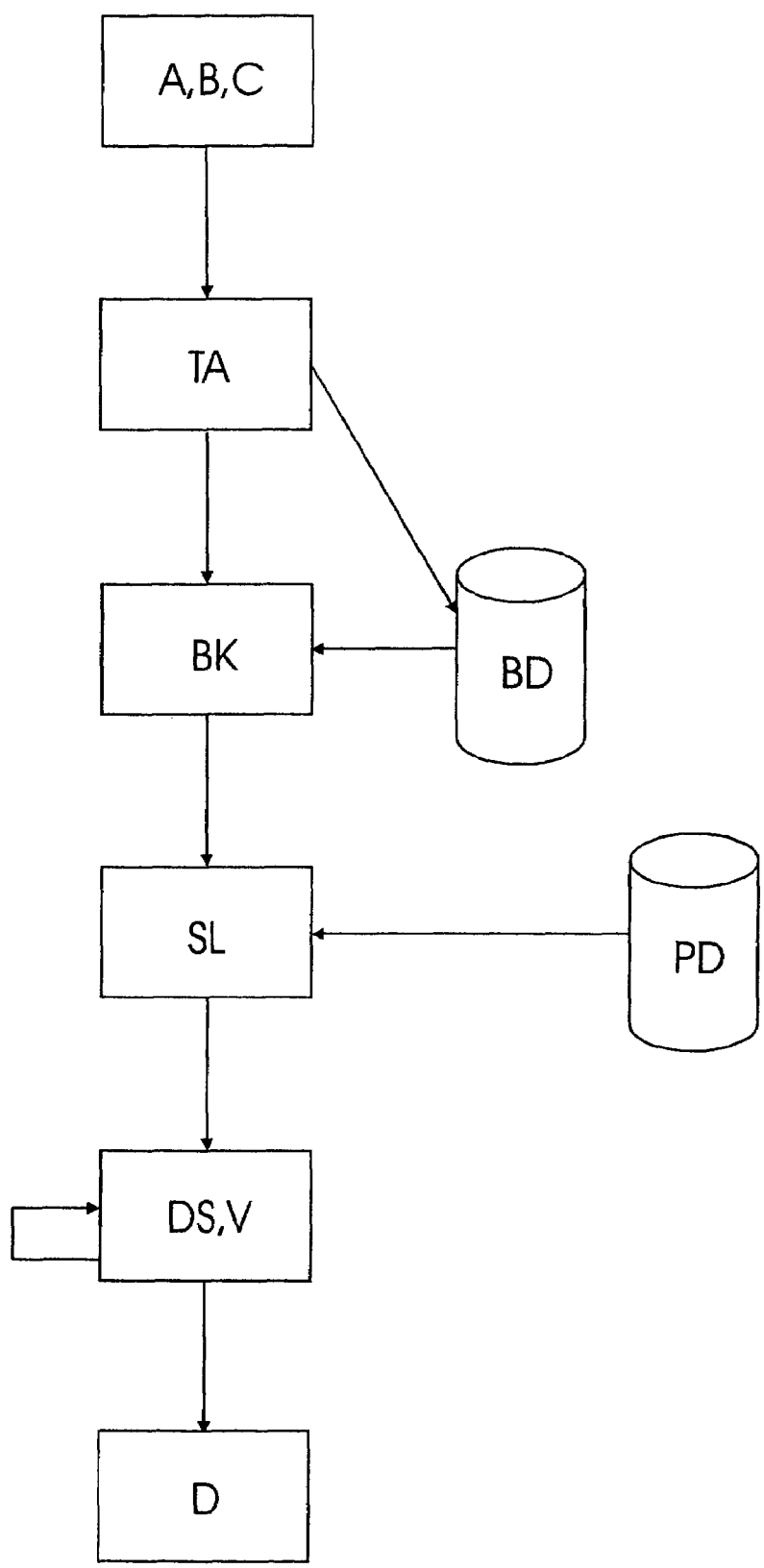
FIG. 2 shows a possible flow chart for the verification process.

FIG. 1 shows an exemplary method according to the present invention, in which the customer possesses a PC having a scanner A, a cellular telephone having a built-in camera B and a fax machine C.

Via his PC having Scanner A, the customer dials the portal, on which the design approach according to the present invention is implemented as system E, and expresses his request for access to the desired service D secured by biometric verification methods. The customer's access request or the destination number/destination address of requested service D is recorded either within the framework of a voice dialog between the customer and dialog system DS of the portal or on the basis of the data entered by the customer. At the same time, the line of the terminal, from which the customer is calling, is also identified. The recording of the caller's line identification and of the destination number/destination address dialed by the caller occurs via a module for determining telecommunications line TA. Via the database for biometrics customer profiles BD, to which all biometrics customer profiles BK of the customers participating in the system are assigned, the customer-specific data, contained in the biometrics customer profile BK, of the customer associated with the line identification are recorded by way of the line identification and transmitted to control logic SL.

The matrix-like configured control logic SL establishes a connection to provider database PD. By comparing the data stored in provider database PD with the destination number/destination address, to which the customer is requesting access, control logic SL records and evaluates the service D requested by the customer and the biometric verification methods authorized for service D.

Within the framework of the exemplary embodiment, the biometric verification methods listed below are authorized for service D requested by the customer:

1. Verification on the basis of speaker recognition by comparing the speech parameters of a codeword,
2. Verification on the basis of face recognition,
3. Verification on the basis of comparing a fingerprint.

On the basis of the data from provider database PD, control logic SL establishes a connection to the database for biometrics customer profiles BD, in which the individual biometrics customer profiles BK of the customers authorized for service D are stored. The connection between customer and the service requested by the customer results in this instance from the line identification of the customer's terminal and of the destination number/destination address of the requested service dialed by the customer.

Via the line identification of the customer terminal, via which the customer accessed the portal, here the PC having scanner A and having the IP address as line identification, control logic SL ascertains the individual biometrics customer profile BK of the respective customer and thereby also the verification options available to the customer within the scope of his terminals or his terminal configuration. In the exemplary embodiment, the customer possesses, in addition to the PC having scanner A, a cellular telephone having camera B and a fax machine C. On account of these terminals or terminal configurations, the following methods for the verification by biometric features are available to the customer for accessing service D:

PC, A: signature, fingerprint/handprint (PC having scanner)

Cell phone w/camera, B: face recognition, retina scanning, voice recognition

Fax machine, C: signature, fingerprint/handprint

Following the comparison of the biometric methods established in the provider database PD for access to the requested service D with the data of biometrics customer profile BK of the calling customer, control logic SL ascertains the biometric verification methods available to the customer on the basis of his terminals or terminal configurations.

In the exemplary embodiment, the customer has available all verification options that are authorized alternatively in the context of the requested service.

For individual biometric verification methods, the customer for the most part even has several terminals available. Thus, for example, verification may be performed with the aid of the fingerprint and the signature of the customer via the customer's PC A, since a scanner is connected to the customer's PC A. At the same time, however, the customer also has a fax machine C available for the same verification options.

The possible verification methods ascertained via control logic SL are subjected to an automatic evaluation with respect to the order of the verification methods to be offered to the customer in succession.

A meaningful selection of the order in which the possible verification methods are offered to the customer achieves an effect that was not to be expected before. This effect additionally increases security during verification and is achieved by the fact that in the transition from one verification method to another verification method the means of a discontinuity of media is used in a targeted manner. A discontinuity of media in this context means that a change of the verification method is also followed by a change of the medium of communication via which the verification is to be performed. For the exemplary embodiment, in which the customer has accessed the portal via the Internet, this would mean that the customer for his first verification attempt is offered, for example, verification via his cellular telephone B. In case the verification attempt via cellular telephone B cannot be concluded successfully, the customer is offered as a second verification option, for example, verification via the fixed network with the inclusion of his fax machine C.

Following an automatic determination of the order in which the verification options are to be offered to the customer, which occurred according to the above-mentioned selection principle, control logic SL establishes via dialog system DS, in connection with a verification query module V, the first connection to the customer's terminal, via which the customer is to be asked to carry out the verification procedure. In the exemplary embodiment, control logic SL activates the customer's cellular telephone B. If the customer accepts the call on his cellular telephone B, he will be asked via voice-controlled dialog system DS, for example, verbally to enter an agreed password for the voice recognition. Following the submission of the password, the submitted password is compared via control logic SL with the language profile stored in biometrics customer profile BK for the customer for speaker recognition. In the case of a match of the language parameters, control logic SL clears the connection to service D dialed by the customer and the customer is automatically connected to the requested service D. If the customer's first verification attempt was not successful, this is recognized by control logic SL. In this case, control logic SL initiates a second verification attempt according to the previously established order. The second verification attempt may be offered to the customer via his fax C. Via fax C, for example, the customer may be asked to provide his signature or an image of the palm of his hand. When providing the signature, the signature received from the customer via fax is compared with the customer's sample signature stored in the customer's biometrics customer profile BK. In the event of a match, the customer is automatically granted access to the service he requested.

According to the principles described above, the customer is offered in succession all verification options, which are authorized for access to the requested service. To this end, all options available to the customer within the scope of his terminals or terminal configuration and the localities of the communications systems are exhausted.

Embodiments of the present invention provides a design approach that makes a customer's access to databases and services protected by biometric verification methods significantly easier. This design approach provides that a separation may be made between the verification process and the service of the provider, and may be performed by oneself. In such a case, the provider only determines the verification methods that he wants to authorize for access to his service(s). The present invention additionally offers that all components required for verification may be arranged within the framework of a self-contained unified design approach, either in a decentralized or centralized manner. Consequently, the verification process as such proceeds according to a unified, internally complex design approach for all database areas or services accessible via the portal, access to which is secured by different biometric verification methods. Control logic SL at the basis of the present invention may be expanded at any time due to its matrix-like structure and may therefore be adapted immediately to changing structures, both with respect to new kinds of biometric verification methods as well as with respect to new kinds of terminals and terminal configurations.

What is claimed is:

1. A method for person/speaker verification via communications systems on the basis of biometric verification methods, comprising:

preparing an individual biometrics customer profile for every customer, in accordance with communications data and communications behavior of the respective customer, in which all terminals and terminal configurations are stored together with respective line identifications, which are configured to be verifiable on the basis of biometric verification methods; assigning each line identification at least one biometric verification method, the technical implementation of which with the aid of the customer's terminal or terminal configuration is technically possible, all biometric basic data of the customer required for a verification on the basis of possible biometric verification methods being queried within the framework of a registration process and likewise recorded in the biometrics customer profile;

storing all services protected via biometric verification methods in a provider database together with the access addresses and the biometric methods authorized for accessing the services;

wherein in the event of a request on the part of a customer for access to a service protected by biometric verification methods, via a matrix-like control logic in conjunction with a module for determining the telecommunications line, on the basis of the line identification of the terminal of the calling customer in conjunction with the access number/access identification of the requested service from the information stored in the customer's biometrics customer profile and in the provider database, the customer is offered with respect to the biometric verification methods authorized within the framework of the requested service, if required in succession all verification options stored in his personal biometrics customer profile in accordance with the terminals and/or terminal configurations available.

2. The method as recited in claim 1, wherein from a multitude of verification options ascertained for the customer, the customer is offered in succession alternative verification options, and the customer, following an unsuccessful conclusion of a first verification attempt, is offered a verification method from the still available alternative verification methods, for the implementation of which a change of the communications connection is required.

3. A system for person/speaker verification via communications systems, comprising:

a control logic, having access to a voice-controlled dialog system having verification dialogs stored for the query;

a module for determining the telecommunications line;

a biometrics customer profile database having the biometrics customer profiles of all customers; and a provider database, wherein the biometrics customer profile contains the names of the customers, the customer's existing terminals/terminal configurations together with the associated local allocations and the line identifications, the biometric verification methods possible for each terminal or for each terminal configuration and the biometric basic data of the respective customer required for the respective biometric verification method, and the provider database includes all access numbers/access addresses to database areas/services, the access to which is protected by biometric verification methods, for every protected database area/service, all biometric verification methods authorized for the access being stored, ready to be queried.

4. The system as recited in claim 3, wherein the control logic is constructed according to the principle of a control matrix.

* * * * *

UNITED STATES PATENT AND TRADEMARK OFFICE
CERTIFICATE OF CORRECTION

PATENT NO. : 7,627,472 B2 Page 1 of 1
APPLICATION NO. : 11/083744
DATED : December 1, 2009
INVENTOR(S) : Trinkel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Second Day of November, 2010

David J. Kappos
*Director of the United States Patent and Trademark Office*